United States Patent
Hwang et al.

(10) Patent No.: US 11,825,358 B2
(45) Date of Patent: Nov. 21, 2023

(54) MEASUREMENT METHOD AND APPARATUS FOR CONDITIONAL HANDOVER

(71) Applicant: Samsung Electronics Co., Ltd., Suwon-si (KR)

(72) Inventors: June Hwang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/060,056

(22) Filed: Sep. 30, 2020

(65) Prior Publication Data
US 2021/0105672 A1 Apr. 8, 2021

(30) Foreign Application Priority Data

Oct. 2, 2019 (KR) .................. 10-2019-0122602
Feb. 14, 2020 (KR) .................. 10-2020-0018575

(51) Int. Cl.
H04W 36/00 (2009.01)
H04W 36/08 (2009.01)

(52) U.S. Cl.
CPC ... *H04W 36/0058* (2018.08); *H04W 36/0094* (2013.01); *H04W 36/00837* (2018.08); *H04W 36/08* (2013.01)

(58) Field of Classification Search
CPC ....... H04W 36/0058; H04W 36/00837; H04W 36/0094; H04W 36/08; H04W 36/36
See application file for complete search history.

(56) References Cited

U.S. PATENT DOCUMENTS

| 9,591,545 | B2 | 3/2017 | Tamura et al. |
| 2019/0223073 | A1 | 7/2019 | Chen et al. |
| 2020/0351694 | A1* | 11/2020 | Chen ............... H04W 36/36 |
| 2022/0272590 | A1* | 8/2022 | Uemura ......... H04W 36/00837 |

FOREIGN PATENT DOCUMENTS

EP 3 047 679 B1 2/2019

OTHER PUBLICATIONS

62842202, Specification, May 2, 2019 (Year: 2019).*
62842211, Specification, May 2, 2019 (Year: 2019).*
Ericsson ("Handling of a HO command while UE is monitoring CHO", 3GPP TSG RAN WG2 #107, R2-1909333, Aug. 26-30, 2019) (Year: 2019).*

(Continued)

*Primary Examiner* — Chi H Pham
*Assistant Examiner* — Ji-Hae Yea

(57) ABSTRACT

Provided is a method, performed by a user equipment (UE), of performing conditional handover, including: receiving measurement configuration information including list information including a plurality of measurement identifications (IDs) and report configuration information associated with the plurality of measurement IDs; performing measurement corresponding to the plurality of measurement IDs, based on the measurement configuration information; and performing conditional handover or reporting a measurement result, based on the measurement result and report configuration information associated with a measurement ID corresponding to the measurement result.

14 Claims, 11 Drawing Sheets

(56) References Cited

OTHER PUBLICATIONS

Ericsson, "Triggering of Conditional Handover in NR", 3GPP TSG RAN WG2 #107, Aug. 26-30, 2019, R2-1909331, 7 pages.
Ericsson, "Suspend while monitoring CHO in NR", 3GPP TSG-RAN WG2 #107, Aug. 26-30, 2019, R2-1909335, 5 pages.
Ericsson, "Conditional Handover Execution in NR", 3GPP TSG RAN WG2 #107, Aug. 26-30, 2019, R2-1909332, 9 pages.
Samsung, "CHO configuration/execution, general aspects still remaining", 3GPP TSG-RAN WG2#107 meeting, Aug. 26-30, 2019, Tdoc R2-1909941, 10 pages.
Notification of Transmittal of The International Search Report and The Written Opinion of the International Searching Authority, or the Declaration dated Dec. 30, 2020 in connection with International Patent Application No. PCT/KR2020/013157, 9 pages.
Ericsson, "Triggering of Conditional Handover in LTE", 3GPP TSG RAN WG2 #107, Aug. 26-30, 2019, R2-1909321, 5 pages.
Supplementary European Search Report dated Sep. 16, 2022 in connection with European Patent Application No. 20 87 0539, 12 pages.

\* cited by examiner

MEASUREMENT METHOD AND APPARATUS FOR CONDITIONAL HANDOVER

CROSS-REFERENCE TO RELATED APPLICATIONS

This application is based on and claims priority under 35 U.S.C. § 119 to Korean Patent Application No. 10-2019-0122602 filed on Oct. 2, 2019, and Korean Patent Application No. 10-2020-0018575 filed on Feb. 14, 2020 in the Korean Intellectual Property Office, the disclosures of which are herein incorporated by reference in their entirety.

BACKGROUND

1. Field

The disclosure relates to operations of a terminal and a base station in a wireless communication system, and more particularly, to a method of handover in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FOAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus, there is a need for methods of effectively providing such services, and in particular, various methods for efficient handover are being provided.

SUMMARY

Provided are an apparatus and method for effectively providing a service in a wireless communication system.

Additional aspects will be set forth in part in the description which follows and, in part, will be apparent from the description, or may be learned by practice of the presented embodiments of the disclosure.

According to an embodiment of the disclosure, a method, performed by a user equipment (UE), of performing conditional handover, includes: receiving measurement configuration information including list information including a plurality of measurement identifications (IDs) and report configuration information associated with the plurality of measurement IDs; performing measurement corresponding to the plurality of measurement IDs, based on the measurement configuration information; and performing conditional handover or reporting a measurement result, based on the measurement result and report configuration information associated with a measurement ID corresponding to the measurement result.

The plurality of measurement IDs may include a measurement ID for the conditional handover, wherein the measurement ID for the conditional handover may be indicated by conditional handover configuration information.

The performing of the conditional handover may include performing the conditional handover on a target cell without reporting, to a serving cell, a measurement result corresponding to the measurement ID for the conditional handover.

Report configuration information associated with the measurement ID for the conditional handover may include information indicating report configuration information for the conditional handover.

The report configuration information associated with the measurement ID for the conditional handover may not include condition information for a measurement result report.

The performing of the conditional handover may include determining that a conditional handover event is fulfilled and performing the conditional handover when the measurement result does not satisfy a leaving condition for a certain period of time after satisfying an entering condition, based on the report configuration information associated with the measurement ID for the conditional handover.

The performing of the conditional handover may include, when there are a plurality of conditional handover events, performing the conditional handover when all of the plurality of conditional handover events are fulfilled.

The method may further include, when the conditional handover is performed, suspending measurement and evaluation corresponding to the measurement ID for the conditional handover.

The method may further include, when the conditional handover is performed, deleting the measurement ID for the conditional handover.

The measurement ID may be associated with at least one measurement object and at least one piece of report configuration information.

According to another embodiment of the disclosure, a user equipment (UE) for performing conditional handover, includes: a transceiver; and a processor combined to the transceiver and configured to receive measurement configuration information including list information including a plurality of measurement identifications (IDs) and report configuration information associated with the plurality of measurement IDs, perform measurement corresponding to the plurality of measurement IDs, based on the measurement configuration information, and perform conditional handover or report a measurement result, based on the measurement result and report configuration information associated with a measurement ID corresponding to the measurement result.

The plurality of measurement IDs may include a measurement ID for the conditional handover, wherein the measurement ID for the conditional handover may be indicated by conditional handover configuration information.

The processor may be further configured to perform the conditional handover on a target cell without reporting, to a serving cell, a measurement result corresponding to the measurement ID for the conditional handover.

Report configuration information associated with the measurement ID for the conditional handover may include information indicating report configuration information for the conditional handover.

The report configuration information associated with the measurement ID for the conditional handover may not include condition information for a measurement result report.

The processor may be further configured to determine that a conditional handover event is fulfilled and perform the conditional handover when the measurement result does not satisfy a leaving condition for a certain period of time after satisfying an entering condition, based on the report configuration information associated with the measurement ID for the conditional handover.

The processor may be further configured to, when there are a plurality of conditional handover events, perform the conditional handover when all of the plurality of conditional handover events are fulfilled.

The processor may be further configured to, when the conditional handover is performed, suspend measurement and evaluation corresponding to the measurement ID for the conditional handover.

The processor may be further configured to, when the conditional handover is performed, delete the measurement ID for the conditional handover.

The measurement ID may be associated with at least one measurement object and at least one piece of report configuration information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
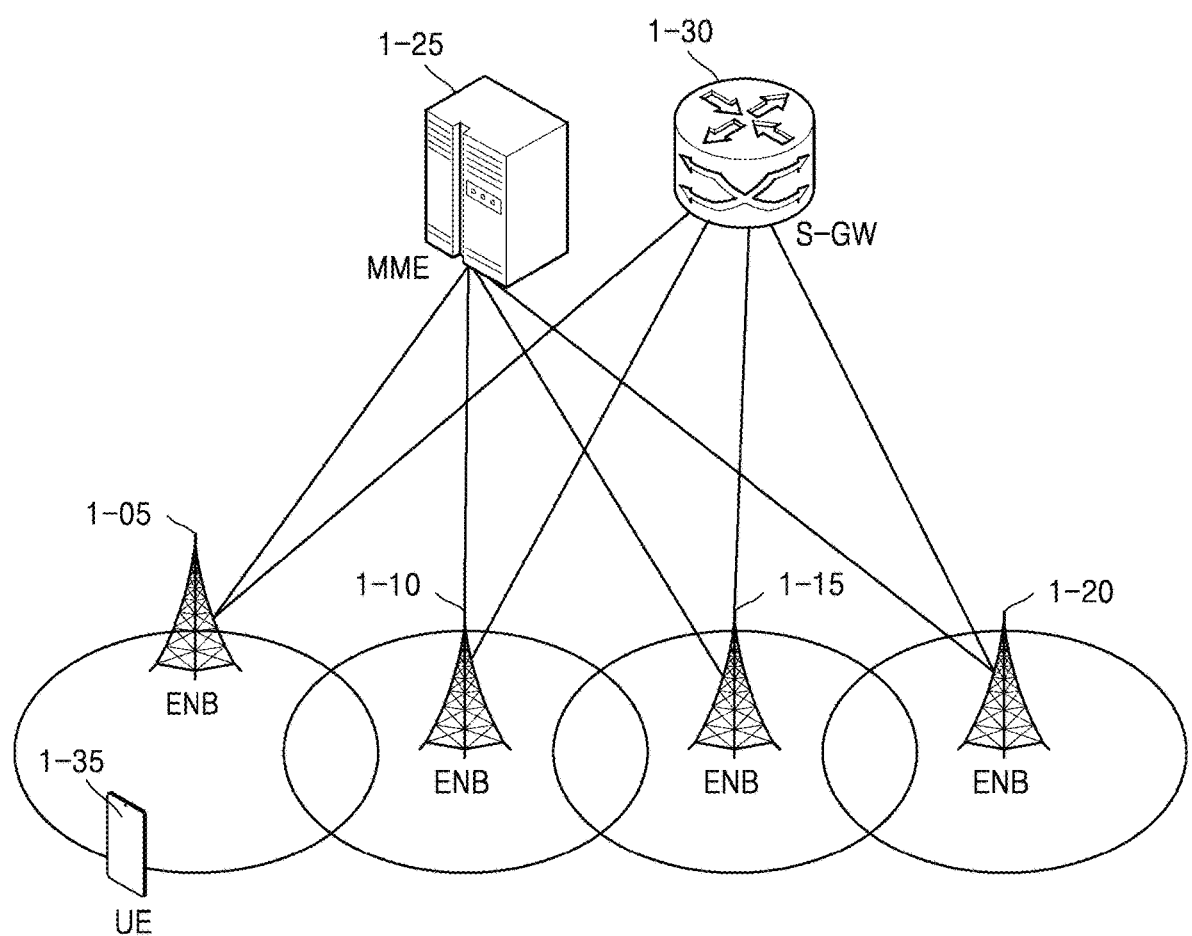
FIG. 1 is a diagram of a structure of a long-term evolution (LTE) system, according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the 3rd generation partnership project long term evolution (3GPP LTE) standard. However, the disclosure is not limited by such terms and names, and may be equally applied to systems conforming to other standards.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used. For example, a terminal may denote a media access control (MAC) entity in a terminal present for each master cell group (MCG) and for each secondary cell group (SCG) described below.

Hereinafter, for convenience of description, the disclosure uses terms and names defined by the 3rd generation partnership project long term evolution (3GPP LTE) standard. However, the disclosure is not limited by such terms and names, and may be equally applied to systems conforming to other standards.

Hereinafter, a base station is an entity that assigns resources of a terminal, and may be at least one of a next generation node B (gNB), an evolved node B (eNB), a node B (NB), a base station (BS), a wireless access unit, a base station controller, or a node on a network. Examples of a terminal may include user equipment (UE), a mobile station (MS), a cellular phone, a smartphone, a computer, and a multimedia system capable of performing a communication function. The disclosure is not limited to the above examples.

In particular, the disclosure may be applied to 3GPP new radio (NR) ($5^{th}$ generation (5G) mobile communication standard). Also, the disclosure may be applied to intelligent services (e.g., smart homes, smart buildings, smart cities, smart cars or connected cars, health care, digital education, retail business, and security and safety related services) based on 5G communication technology and IoT related technology. In the disclosure, an eNB may be interchangeably used with a gNB for convenience of description. In other words, a base station described as an eNB may also indicate a gNB. Also, the term 'terminal' may indicate not only mobile phones, narrow band-Internet of things (NB-IoT) devices, and sensors, but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (e.g., eNB), and the DL refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra-reliability low latency communication (hereinafter, URLLC), etc.

According to an embodiment of the disclosure, the eMBB aims to provide a higher data rate than a data rate supported by the LTE, LTE-A, or LTE-Pro system. For example, in the 5G communication system, the eMBB should be able to provide a peak data rate of 20 Gbps in the DL and a peak data rate of 10 Gbps in the UL from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/$km^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra-low latency) and very high reliability (ultra-high reliability). For example, a service supporting the URLLC should satisfy air interface latency smaller than 0.5 milliseconds and at the same time, may have a packet error rate of $10^{-5}$ or less. Accordingly, for URLLC-supportive services, the 5G communication system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the disclosure is applied are not limited thereto.

Also, although embodiments of the disclosure are described by using the LTE, LTE-A, LTE Pro, or 5G (or NR) system, the embodiments of the disclosure may be applied to other communication systems having a similar technical background or channel type. Also, it will be understood by one of ordinary skill in the art that embodiments of the disclosure may be applied to other communication systems through some modifications without departing from the scope of the disclosure.

The disclosure relates to a handover condition signal method and apparatus for conditional handover in a wireless communication system. According to an embodiment of the disclosure, when a user equipment (UE) performs conditional handover, a network may transmit condition information of the conditional handover via measurement configuration information. In this case, the UE may need to distinguish between measurement configuration for normal measurement report and measurement configuration for conditional handover and perform a conditional handover measurement operation different from a normal measurement report measurement operation by distinguishing the normal measurement report measurement configuration and the conditional handover measurement configuration.

Also, according to an embodiment of the disclosure, a measurement identification (ID) may be referred to when the condition information of the conditional handover is signaled to the UE. Measurement of the conditional handover verified by referring to the measurement ID operates differently from normal measurement, and the conditional handover may be performed instead of measurement report.

According to an embodiment of the disclosure, the UE may directly perform the conditional handover without unnecessary measurement report and may operate by distinguishing between a normal measurement ID and a conditional handover measurement ID. Regarding the conditional handover measurement, handover may be directly performed without reporting, measurement may be stopped during handover to prevent unnecessary redundant conditional handover, and measurement configuration information may be removed after handover is performed to prevent erroneous conditional handover from starting from a change of a serving cell.

FIG. 1 is a diagram of a structure of a long-term evolution (LTE) system, according to an embodiment of the disclosure.

Referring to FIG. 1, a radio access network (RAN) of the LTE system may include evolved node Bs (eNBs) 1-05, 1-10, 1-15, and 1-20 (node Bs (NBs) or base stations), a mobility management entity (MME) 1-25, and a serving-gateway (S-GW) 1-30. A UE 1-35 (or a terminal) may access an external network via the eNB 1-05, 1-10, 1-15, or 1-20 and the S-GW 1-30.

In FIG. 1, each of the eNBs 1-05, 1-10, 1-15, and 1-20 may correspond to an existing NB of a universal mobile telecommunications system (UMTS). The eNB 1-05, 1-10, 1-15, or 1-20 may be connected to the UE 1-35 through a radio channel and may perform complex functions compared to the existing NB. In the LTE system, all user traffic including a real-time service such as voice over internet protocol (VoIP) may be provided via a shared channel. Accordingly, an entity that schedules UE 1-35 by gathering state information such as buffer states, available transmit power states, and channel states of the UEs 1-35 is required, and the eNB 1-05, 1-10, 1-15, or 1-20 may operate as the entity. One eNB 1-05, 1-10, 1-15, or 1-20 may generally control a plurality of cells. For example, the LTE system may use radio access technology such as orthogonal frequency division multiplexing (OFDM) at a bandwidth of 20 MHz to achieve a data rate of 100 Mbps. Also, adaptive modulation and coding (AMC) may be used to determine a modulation scheme and a channel coding rate in accordance with a channel status of the UE 1-35. The S-GW 1-30 is an entity for providing data bearers and may configure or release the data bearers under the control of the MME 1-25. The MME 1-25 is an entity for performing a mobility management function and various control functions for the UE 1-35 and may be connected to the eNBs 1-05, 1-10, 1-15, and 1-20.

Figure 2:
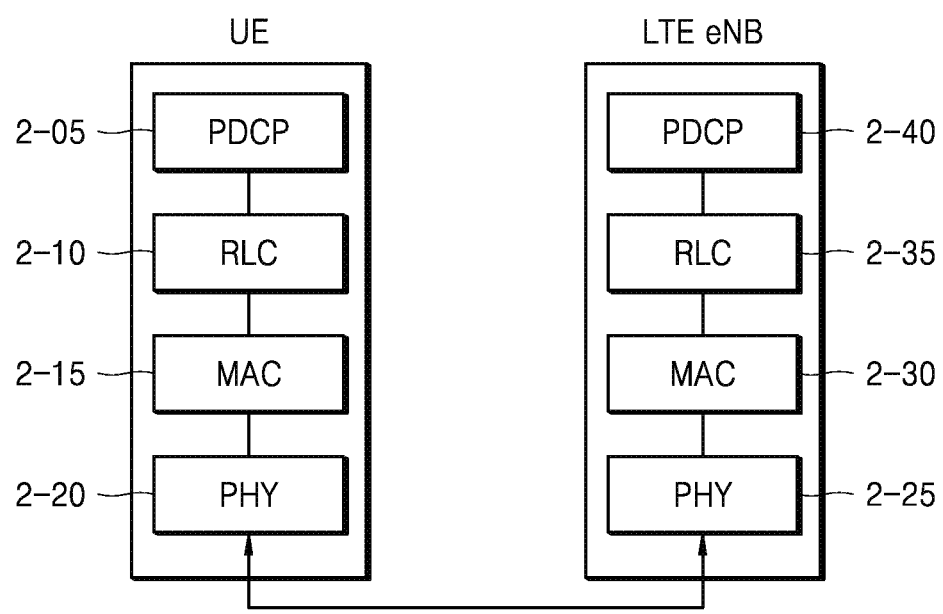
FIG. 2 is a diagram of a radio protocol architecture in an LTE system, according to an embodiment of the disclosure.

FIG. 2 is a diagram of a radio protocol architecture in an LTE system, according to an embodiment of the disclosure.

Referring to FIG. 2, a radio protocol of the LTE system may include packet data convergence protocol (PDCP) layers 2-05 and 2-40, radio link control (RLC) layers 2-10 and 2-35, media access control (MAC) layers 2-15 and 2-30, and physical (PHY) layers 2-20 and 2-25 respectively for a UE and an eNB. The PDCP layer 2-05 or 2-40 may perform operations such as internet protocol (IP) header compression/restoration. Main functions of the PDCP layer 2-05 or 2-40 may be summarized as below.

- Header compression and decompression: robust header compression (ROHC) only
- Transfer of user data
- In-sequence delivery of upper layer packet data units (PDUs) at PDCP re-establishment procedure for RLC acknowledged mode (AM)
- For split bearers in dual connectivity (DC) (only support for RLC AM): PDCP PDU routing for transmission and PDCP PDU reordering for reception)
- Duplicate detection of lower layer service data units (SDUs) at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The RLC layer 2-10 or 2-35 may perform, for example, an automatic request (ARQ) operation by reconfiguring PDCP PDUs to appropriate sizes. Main functions of the RLC layer 2-10 or 2-35 may be summarized as below.

- Transfer of upper layer PDUs
- Error Correction through ARQ (only for AM data transfer)
- Concatenation, segmentation, and reassembly of RLC SDUs (only for unacknowledged mode (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC layer 2-15 or 2-30 is connected to multiple RLC layers configured for a single UE and may multiplex RLC PDUs into a MAC PDU and demultiplex the RLC PDUs from the MAC PDU. Main functions of the MAC layer 2-15 or 2-30 may be summarized as below.

- Mapping between logical channels and transport channels
- Multiplexing/demultiplexing of MAC SDUs belonging to one or different logical channels into/from transport blocks (TBs) delivered to/from the physical layer on transport channels
- Scheduling information reporting
- Error correction through hybrid automatic request (HARD)
- Priority handling between logical channels of one UE
- Priority handling between UEs by means of dynamic scheduling
- Multimedia broadcast and multicast service (MBMS) identification
- Transport format selection
- Padding According to an embodiment of the disclosure, the PHY layer 2-20 or 2-25 may channel-code and modulate upper layer data into OFDM symbols and transmit the OFDM symbols through a radio channel. Also, the PHY layer 2-20 or 2-25 may demodulate OFDM symbols received through a radio channel and channel-decode and deliver the OFDM symbols to an upper layer. However, the disclosure is not limited to the above examples.

Figure 3:
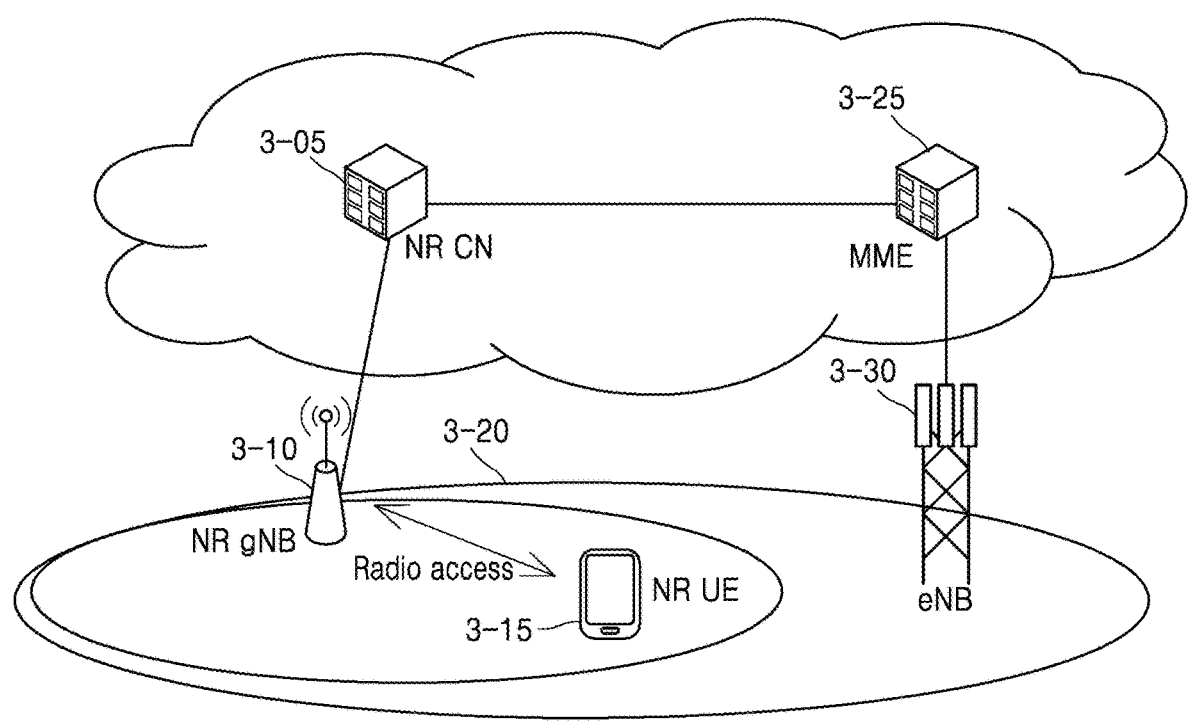
FIG. 3 is a diagram of a structure of a next-generation mobile communication system, according to an embodiment of the disclosure.

FIG. 3 is a diagram of a structure of a next-generation mobile communication system, according to an embodiment of the disclosure.

Referring to FIG. 3, a RAN of a next-generation mobile communication system (hereinafter, NR or 2G) may include an NR gNB 3-10 (or NR base station) and an NR core network (CN) 3-05. An NR UE 3-15 (or a terminal) may access an external network via the NR gNB 3-10 and the NR CN 3-05.

In FIG. 3, the NR gNB 3-10 may correspond to an eNB of an existing LTE system. The NR gNB 3-10 is connected to the NR UE 3-15 through radio channels and may provide superior services compared to an existing NB. In the next-generation mobile communication system, all user traffic may be provided via a shared channel. Accordingly, an entity that schedules NR UEs 3-15 by gathering state information such as buffer states, available transmit power states, and channel states of the NR UEs 3-15 is required, and the NR gNB 3-10 may operate as the entity. A single NR gNB 3-10 may control a plurality of cells. In the next-generation mobile communication system, a bandwidth equal to or greater than a current maximum bandwidth may be applied to implement an ultra-high data rate compared to a current LTE system. Also, a beamforming technique may be grafted by using OFDM as a radio access technique.

Also, according to an embodiment of the disclosure, the NR gNB 3-10 may use AMC to determine a modulation scheme and a channel coding rate in accordance with a channel status of the NR UE 3-15. The NR CN 3-05 may perform functions such as mobility support, bearer setup, and quality of service (QoS) setup. The NR CN 3-05 is an entity for performing a mobility management function and various control functions for the NR UE 3-15 and may be connected to a plurality of NR gNBs 3-10. The next-generation mobile communication system may cooperate with the existing LTE system, and the NR CN 3-05 may be connected to an MME 3-25 through a network interface. The MME 3-25 may be connected to an existing eNB 3-30.

Figure 4:
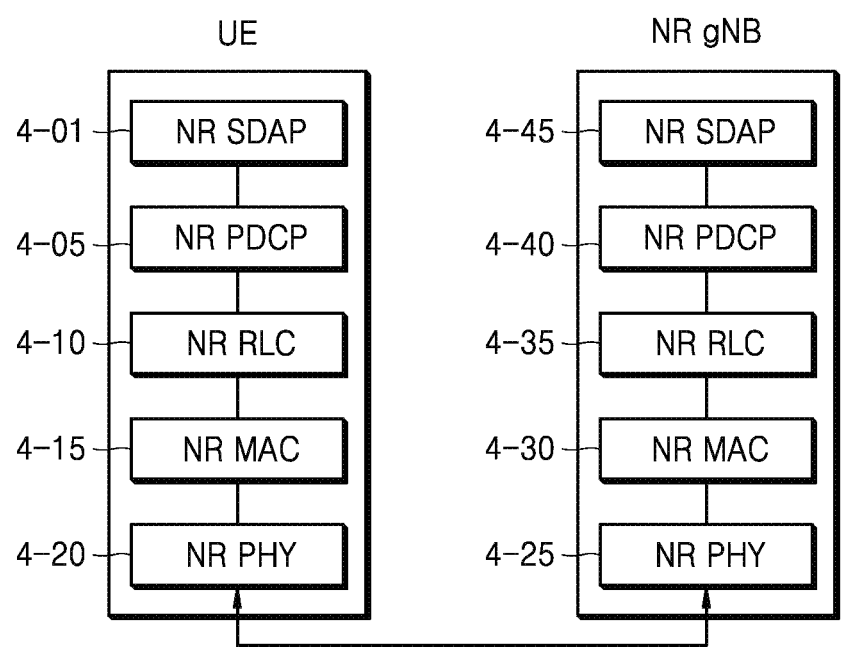
FIG. 4 is a diagram of a radio protocol architecture of a next-generation mobile communication system, according to an embodiment of the disclosure.

FIG. 4 is a diagram of a radio protocol architecture of a next-generation mobile communication system, according to an embodiment of the disclosure.

Referring to FIG. 4, a radio protocol of the next-generation mobile communication system may include NR service data adaptation protocol (SDAP) layers 4-01 and 4-45, NR PDCP layers 4-05 and 4-40, NR RLC layers 4-10 and 4-35, NR MAC layers 4-15 and 4-30, and NR PHY layers 4-20 and 4-25 respectively for a UE and an NR gNB.

Main functions of the NR SDAP layers 4-01 and 4-45 may include some of the following functions. However, the main functions are not limited thereto.

- Transfer of user plane data
- Mapping between QoS flow and a data radio bearer (DRB) for both DL and UL
- Marking QoS flow ID in both DL and UL packets
- Reflective QoS flow to DRB mapping for the UL SDAP PDUs With respect to the NR SDAP layer 4-01 or 4-45, the UE may receive, via an RRC message, configurations on whether to use a header of the NR SDAP layer 4-01 or 4-45 or use a function of the NR SDAP layer 4-01 or 4-45 for each NR PDCP layer 4-05 or 4-40, each bearer, or each logical channel. When the SDAP header is configured, a 1-bit non-access stratum (NAS) reflective QoS configuration indicator and a 1-bit access stratum (AS) reflective QoS configuration indicator of the SDAP header may indicate the UE to update or reconfigure QoS flow of UL and DL and data bearer mapping information. The SDAP header may include QoS flow ID information indicating QoS. The QoS information may be used as data processing priority information, scheduling information, etc. for supporting a smooth service.

According to an embodiment of the disclosure, main functions of the NR PDCP layer 4-05 or 4-40 may include some of the following functions. However, the main functions are not limited thereto.

- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink A reordering function of the NR PDCP layer 4-05 or 4-40 may include denote a function of reordering PDCP PDUs received from a lower layer, based on a PDCP sequence number (SN). The reordering function of the NR PDCP layer 4-05 or 4-40 may include a function of delivering the reordered data to an upper layer in order or a function of immediately delivering the reordered data without considering an order, may include a function of recording missing PDCP PDUs by reordering the PDCP PDUs, may include a function of reporting status information of the missing PDCP PDUs to a transmitter, or may include a function of requesting to retransmit the missing PDCP PDUs.

According to an embodiment of the disclosure, the main functions of the NR RLC layer 4-10 or 4-35 may include at least some of the following functions. However, the main functions are not limited thereto.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC layer 4-10 or 4-35 may denote a function of delivering RLC SDUs received from a lower layer, to an upper layer in order. When one RLC SDU is segmented into a plurality of RLC SDUs and received, the in-sequence delivery of the NR RLC layer 4-10 or 4-35 may include reassembly and delivery functions.

The in-sequence delivery of the NR RLC layer 4-10 or 4-35 may include a function of reordering received RLC PDUs on an RLC SN or PDCP SN basis, a function of recording missing RLC PDUs by reordering the RLC PDUs, a function of reporting status information of the missing RLC PDUs to a transmitter, or a function of requesting to retransmit the missing RLC PDUs.

The in-sequence delivery of the NR RLC layer 4-10 or 4-35 may include a function of delivering only RLC SDUs previous to a missing RLC SDU, to the upper layer in order, when the missing RLC SDU exists.

The in-sequence delivery of the NR RLC layer 4-10 or 4-35 may include a function of delivering all RLC SDUs received before a certain timer started, to the upper layer in order, when the certain timer expired despite of a missing RLS SDU.

The in-sequence delivery of the NR RLC layer 4-10 or 4-35 may include a function of delivering all RLC SDUs currently received to the upper layer in order, when a certain timer expired despite of a missing RLS SDU.

The NR RLC layer 4-10 or 4-35 may process RLC PDUs in an order of reception regardless of an order of SN (out-of-sequence delivery), and deliver the RLC PDUs to the NR PDCP layer 4-05 or 4-40.

When the NR RLC layer 4-10 or 4-35 receives segments, the NR RLC layer 4-10 or 4-35 may reassemble the segments received or stored in a buffer, into a whole RLC PDU and deliver the RLC PDU to the NR PDCP layer 4-05 or 4-40.

The NR RLC layer 4-10 or 4-35 may not have a concatenation function, and the concatenation function may be performed by the NR MAC layer 4-15 or 4-30 or be replaced with a multiplexing function of the NR MAC layer 4-15 or 4-30.

In the above description, out-of-sequence delivery of the NR RLC layer 4-10 or 4-35 may denote a function of delivering RLC SDUs received from a lower layer, immediately to an upper layer out of an order. The out-of-sequence delivery of the NR RLC layer 4-10 or 4-35 may include a function of reassembling several RLC SDUs when originally one RLC SDU is segmented and received in the several RLC SDUs. The out-of-sequence delivery of the NR RLC layer 4-10 or 4-35 may include a function of storing RLC SNs or PDCP SNs of received RLC PDUs and recording missing RLC PDUs by aligning the received RLC PDUs in an order.

According to an embodiment of the disclosure, the NR MAC layer 4-15 or 4-30 may be connected to multiple NR RLC layers configured for a single UE, and main functions of the NR MAC layer 4-15 or 4-30 may include at least some of the following functions. However, the main functions are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to an embodiment of the disclosure, the NR PHY layer 4-20 or 4-25 may channel-code and modulate upper layer data into OFDM symbols and transmit the OFDM symbols through a radio channel. Also, the NR PHY layer 4-20 or 4-25 may demodulate OFDM symbols received through a radio channel and channel-decode and deliver the OFDM symbols to an upper layer. However, the disclosure is not limited to the above examples.

Figure 5:
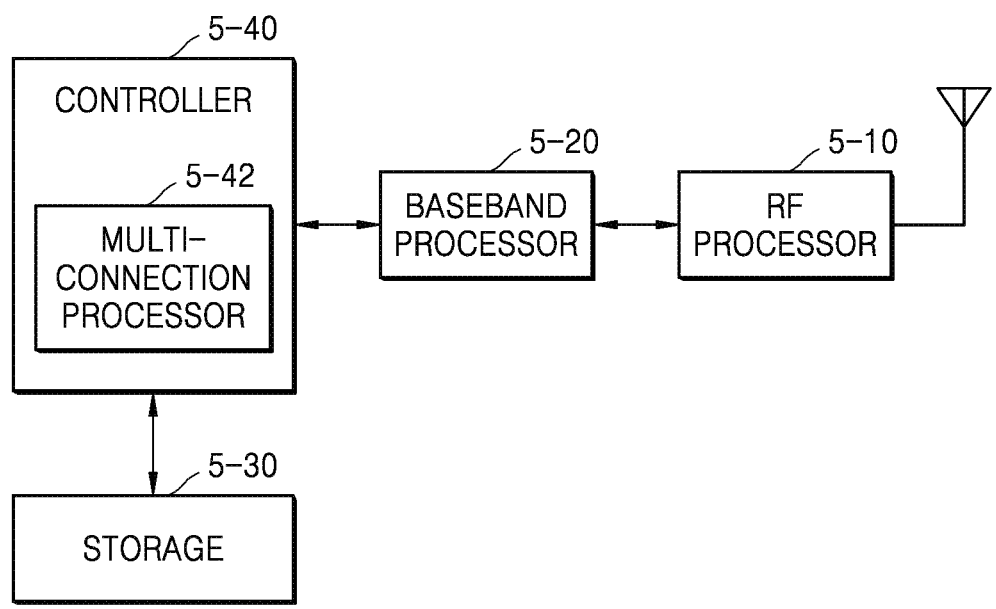
FIG. 5 is a block diagram showing an internal structure of a user equipment (UE), according to an embodiment of the disclosure.

FIG. 5 is a block diagram showing an internal structure of a UE, according to an embodiment of the disclosure.

Referring to FIG. 5, the UE may include a radio frequency (RF) processor 5-10, a baseband processor 5-20, a storage 5-30, and a controller 5-40. Also, the controller 5-40 may include a multi-connection processor 5-42. However, the UE is not limited thereto and may include more or less components than those shown in FIG. 5.

The RF processor 5-10 may perform functions for transmitting and receiving signals through radio channels, e.g., signal band conversion and amplification. That is, the RF processor 5-10 up-converts a baseband signal provided from the baseband processor 5-20, to an RF band signal and transmit the RF band signal through an antenna, and down-converts an RF band signal received through an antenna, to a baseband signal. For example, the RF processor 5-10 may include a transmit filter, a receive filter, an amplifier, a mixer, an oscillator, a digital-to-analog converter (DAC), and an analog-to-digital converter (ADC). Although only a single antenna is illustrated in FIG. 5, the UE may include multiple antennas. The RF processor 5-10 may include a plurality of RF chains. The RF processor 5-10 may perform beamforming. For beamforming, the RF processor 5-10 may adjust phases and amplitudes of signals transmitted or received through a plurality of antennas or antenna elements. The RF processor 5-10 may perform a MIMO operation and may receive several layers while performing the MIMO operation.

The baseband processor 5-20 may convert between a baseband signal and a bitstream based on physical layer specifications of a system. For example, for data transmission, the baseband processor 5-20 generates complex symbols by encoding and modulating a transmit bitstream. For data reception, the baseband processor 5-20 reconstructs a received bitstream by demodulating and decoding a baseband signal provided from the RF processor 5-10. For example, according to an OFDM scheme, for data transmission, the baseband processor 5-20 generates complex symbols by encoding and modulating a transmit bitstream, maps the complex symbols to subcarriers, and then configures OFDM symbols by performing inverse fast Fourier transform (IFFT) and inserting a cyclic prefix (CP). For data reception, the baseband processor 5-20 may split a baseband signal provided from the RF processor 5-10, in OFDM symbol units, reconstruct signals mapped to subcarriers by performing fast Fourier transform (FFT), and then reconstruct a received bitstream by demodulating and decoding the signals.

The baseband processor 5-20 and the RF processor 5-10 transmit and receive signals as described above. As such, each of the baseband processor 5-20 and the RF processor 5-10 may also be called a transmitter, a receiver, a transceiver, or a communicator. At least one of the baseband processor 5-20 or the RF processor 5-10 may include a plurality of communication modules to support a plurality of different radio access technologies. Also, at least one of the baseband processor 5-20 or the RF processor 5-10 may include different communication modules to process signals of different frequency bands. For example, the different radio access technologies may include wireless LAN (For example, IEEE 802.11), a cellular network (for example, LTE), and the like. The different frequency bands may include a super high frequency (SHF) (e.g., 2.5 GHz and 5 GHz) band and a millimeter wave (mmWave) (e.g., 60 GHz) band. The UE may transmit or receive a signal to or from a base station by using the baseband processor 5-20 and the RF processor 5-10, and the signal may include control information and data.

The storage 5-30 may store data for operation of the UE, e.g., basic programs, application programs, and configuration information. In particular, the storage 5-30 may store information related to a second access node performing wireless communication by using a second wireless access technology. The storage 5-30 may provide the stored data upon request by the controller 5-40. The storage 5-30 may be configured in a storage medium, such as read-only memory (ROM), random access memory (RAM), a hard disk, compact disc-ROM (CD-ROM), or digital versatile disc (DVD), or a combination thereof. Also, the storage 5-30 may be configured in a plurality of memories.

The controller 5-40 may control overall operations of the UE. For example, the controller 5-40 may transmit and receive signals through the baseband processor 5-20 and the RF processor 5-10. The controller 5-40 may record and read data on and from the storage 5-30. In this regard, the controller 5-40 may include at least one processor. For example, the controller 5-40 may include a communication processor (CP) for controlling communications and an application processor (AP) for controlling an upper layer such as an application program. Also, at least one component in the UE may be embodied in one chip.

According to an embodiment of the disclosure, the controller 5-40 may control each component of the UE to perform a measurement method for handover according to an embodiment of the disclosure. The handover method according to an embodiment of the disclosure will be described in detail below with reference to FIGS. 7 through 9.

Figure 6:
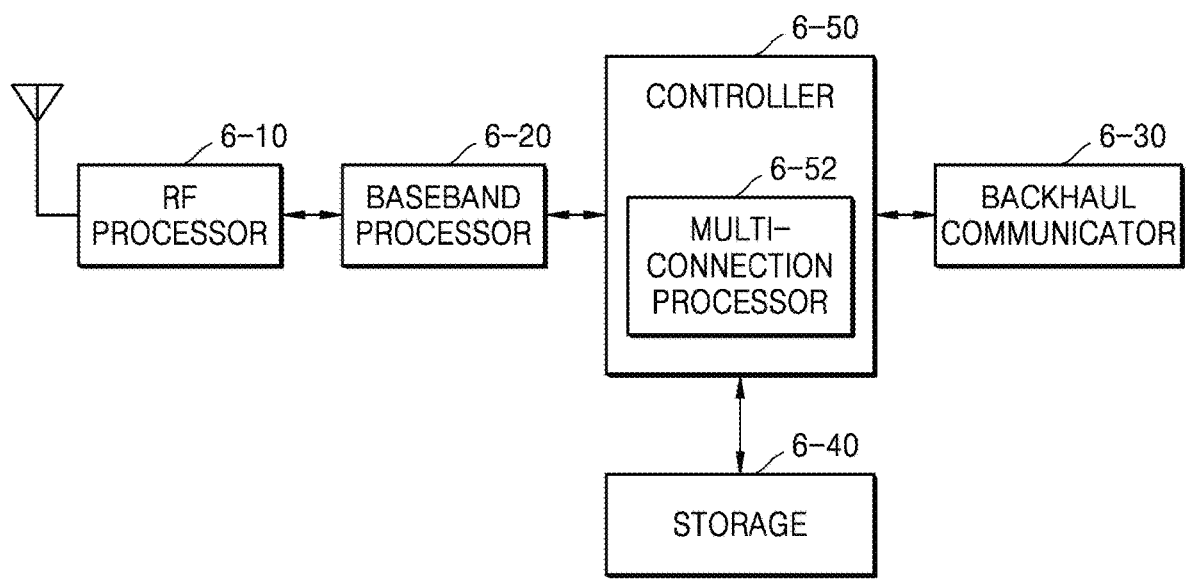
FIG. 6 is a block diagram of a configuration of a new radio (NR) next generation node B (gNB), according to an embodiment of the disclosure.

FIG. 6 is a block diagram of a configuration of a new radio (NR) gNB, according to an embodiment of the disclosure.

Referring to FIG. 6, a NR gNB may include an RF processor 6-10, a baseband processor 6-20, a backhaul communicator 6-30, a storage 6-40, and a controller 6-50. The controller 6-50 may further include a multi-connection processor 6-52. However, the NR gNB is not limited thereto and may include more or less components than those shown in FIG. 6.

The RF processor 6-10 may perform functions for transmitting and receiving signals through radio channels, e.g., signal band conversion and amplification. That is, the RF processor 6-10 up-converts a baseband signal provided from the baseband processor 6-20, to an RF band signal and transmit the RF band signal through an antenna, and down-converts an RF band signal received through an antenna, to a baseband signal. For example, the RF processor 6-10 may include a transmit filter, a receive filter, an amplifier, a mixer, an oscillator, a DAC, and an ADC. Although only a single antenna is illustrated in FIG. 6, the NR gNB may include a plurality of antennas. The RF processor 6-10 may include a plurality of RF chains. In addition, the RF processor 6-10 may perform beamforming. For beamforming, the RF processor 6-10 may adjust phases and amplitudes of signals transmitted or received through a plurality of antennas or antenna elements. The RF processor 6-10 may perform a DL MIMO operation by transmitting at least one layer.

The baseband processor 6-20 may convert between a baseband signal and a bitstream based on physical layer specifications of a first radio access technology. For example, for data transmission, the baseband processor 6-20 generates complex symbols by encoding and modulating a transmit bitstream. For data reception, the baseband processor 6-20 reconstructs a received bitstream by demodulating and decoding a baseband signal provided from the RF processor 6-10. For example, according to an OFDM scheme, for data transmission, the baseband processor 6-20 generates complex symbols by encoding and modulating a transmit bitstream, maps the complex symbols to subcarriers, and then configures OFDM symbols by performing IFFT and CP insertion. For data reception, the baseband processor 6-20 may split a baseband signal provided from the RF processor 6-10, in OFDM symbol units, reconstruct signals mapped to subcarriers by performing FFT, and then reconstruct a received bitstream by demodulating and decoding the signals. The baseband processor 6-20 and the RF processor 6-10 transmit and receive signals as described above. As such, each of the baseband processor 6-20 and the RF processor 6-10 may also be called a transmitter, a receiver, a transceiver, a communicator, or a wireless communicator. The NR gNB may transmit or receive a signal to or from a UE by using the baseband processor 6-20 and the RF processor 6-10, and the signal may include control information and data.

The backhaul communicator 6-30 may provide an interface for communicating with other nodes in a network. In other words, the backhaul communicator 6-30 may convert a bit string transmitted from the NR gNB to another node, for example, an auxiliary base station or a core network, into a physical signal, and convert a physical signal received from the other node into a bit string. The backhaul communicator 6-30 may be included in a communicator.

The storage 6-40 may store data for operation of the NR gNB described above, e.g., basic programs, application programs, and configuration information. In particular, the storage 6-40 may store information about bearers allocated for a connected UE, a measurement report transmitted from the connected UE, etc. The storage 6-40 may store criteria information used to determine whether to provide or release multi-connectivity to or from the UE. The storage 6-40 may provide the stored data upon request by the controller 6-50. The storage 6-40 may be configured in a storage medium, such as ROM, RAM, a hard disk, CD-ROM, or DVD, or a combination thereof. Also, the storage 6-40 may be configured in a plurality of memories.

The controller 6-50 may control overall operations of the NR gNB. For example, the controller 6-50 may transmit and receive signals through the baseband processor 6-20 and the RF processor 6-10 or through the backhaul communicator 6-30. The controller 6-50 may record and read data on and from the storage 6-40. In this regard, the controller 6-50 may include at least one processor. Also, at least one component in the NR gNB may be embodied in one chip.

According to an embodiment of the disclosure, the controller 6-50 may control each component of the UE to perform a measurement method for handover according to an embodiment of the disclosure. The handover method according to an embodiment of the disclosure will be described in detail below with reference to FIGS. 7 through 9.

A serving base station may transmit conditional handover measurement configuration information to a UE via a following method. In other words, the UE may identify that measurement configuration information is the conditional handover measurement configuration information in following cases. The cases are not limited thereto and may be combined with each other for operations.

When a measurement ID includes a 1-bit indicator indicating conditional handover,
  when a measurement ID is associated with configuration information of a target candidate cell of conditional handover,
  when even one of a measurement object and report configuration configuring one measurement ID is associated with a target candidate cell of conditional handover,
  when even one of a measurement object and report configuration configuring a measurement ID includes an indicator indicating conditional handover, or
  when a serving base station signals by using a conditional handover (CHO) measurement ID list, i.e., a new measId list called MeasIdToAddModList CHO and a measurement ID is included in the measId list,
  a final operation of normal measurement is to perform a measurement report when an event is fulfilled for a normal measurement report measurement ID, but according to an embodiment of the disclosure, a final operation of conditional handover measurement may be to directly perform conditional handover when a conditional handover measurement ID is configured and an event is fulfilled. Accordingly, when measurement configuration is provided in terms of a UE, a new branched operation may be generated.

Upon receiving measurement information from the serving base station via at least one of the above-described methods, the UE may receive a measurement ID and determine (or identify) whether the measurement ID is a normal measurement report measurement ID or a conditional handover measurement ID, based on at least one of the above-described methods. The UE may perform different operations on measurement indicated by the measurement ID by determining whether the measurement ID is a normal measurement report measurement ID or a conditional handover measurement ID.

Regarding a configuration method of a conditional handover measurement ID, a normal measurement ID is associated with one measurement object and one report configuration whereas a conditional handover measurement ID may be associated with one measurement object and one or more report configurations. Alternatively, two measurement IDs associated with one measurement object and one report configuration may be considered as a conditional handover measurement ID.

In other words, according to an embodiment of the disclosure, the UE may receive measurement configuration information from a base station and determine whether the measurement configuration information is measurement report configuration information or conditional handover measurement configuration information according to the above-described method. The UE may identify (or determine) whether a certain event is fulfilled based on the measurement configuration information. When the certain event is fulfilled, the UE may perform measurement report when the measurement configuration information is measurement report configuration information and perform conditional handover when the measurement configuration information is conditional handover measurement configuration information. When the received measurement configuration information includes both the measurement report configuration information and the conditional handover measurement configuration information, the measurement report and the conditional handover may all be performed.

Regarding a measurement method, when a measurement ID of the UE is normal measurement report measurement and s-measure is configured in the UE, the UE may not perform measurement of the measurement ID when reception strength of special cell (spcell) is greater than a configuration value of the s-measure. When the reception strength of the spcell is smaller than the configuration value of the s-measure, the UE may perform the measurement of the measurement ID. When the measurement ID is for conditional handover, the UE may perform the measurement of the measurement ID regardless of the reception strength of the spcell even when the s-measure is configured.

When the measurement ID is for normal measurement regarding a measurement report, the UE may perform the measurement report when an event of report configuration associated with the measurement ID is fulfilled. When the measurement ID is for conditional handover, the UE may perform the conditional handover on a target candidate cell associated with the measurement ID when there is one report configuration associated with the measurement ID and an event of the report configuration is fulfilled. When there are two or more report configuration associated with the measurement ID, the conditional handover may be performed on the target candidate cell associated with the measurement ID when all events of the report configuration are fulfilled.

In relation to determining whether an associated event is fulfilled during measurement, two events may be configured for one report configuration or one measurement ID and two report configurations may be associated in case of a conditional handover measurement ID. When two events are configured, the UE may perform conditional handover on a target cell at a time point when the two events are both fulfilled. The two events may each be configured with measurement trigger quantity, time-to-trigger, reference signal (RS) type, offset, and hysteresis. An RS may be measured via information of a given RS type and measTriggerQuantity may configure a value corresponding to reference signal received quality (RSRQ), reference signal received power (RSRP), or a signal interference plus noise ratio (SINK). The UE may derive a measurement value and apply offset and hysteresis corresponding to the event to the measurement value. When a result of applying the offset and hysteresis reaches an entering condition and a leaving condition is not reached at least for a period of time-to-trigger, it may be determined that the event is fulfilled.

As described above, when the two events are configured, the UE may perform conditional handover when the two events are simultaneously (or both) fulfilled. According to an embodiment of the disclosure, when one event is fulfilled first and then the other remaining event is fulfilled regardless of whether a leaving condition is satisfied, with there being a time difference between fulfillment time points of the two events, information about a tolerable time difference between the fulfillment time points of the two events for considering that the events are fulfilled may be additionally configured. When a serving cell provides, to report configuration of a conditional handover measurement ID, time difference configuration information (a time difference value) that is the information about the tolerable time difference between the fulfillment time points of the two events, the UE may determine (or consider) that conditional handover measurement is fulfilled and perform conditional handover on a target cell when the two different events are transmitted to the report configuration, one event is fulfilled and then the other event is fulfilled during the time difference value.

Also, according to an embodiment of the disclosure, the conditional handover measurement ID may be associated with one report configuration and two events may be configured in the report configuration. In this case, a new entering condition corresponding to an AND condition of two entering conditions may be defined considering an entering condition applied to an existing normal measurement event with respect to each of the two events. Also, a new leaving condition corresponding to an AND operation of two leaving conditions may be defined.

Also, according to an embodiment of the disclosure, while performing handover, the UE continues to perform measurement for all measurement IDs in case of normal measurement ID and evaluate event fulfillment. In case of the conditional handover measurement ID, the UE may suspend measuring the given conditional handover measurement ID and evaluating event fulfillment while arbitrarily performing conditional handover or normal handover.

When handover is completed, the UE does not delete but maintains all measurement IDs for the normal measurement ID. On the other hand, the UE may delete a measurement ID and configuration information at a corresponding target cell for the conditional handover measurement ID.

Measurement of the normal measurement report measurement ID may be included in at least one of a serving cell measurement result or a neighbor cell measurement result, based on a report quantity standard configured in report configuration associated with the normal measurement report measurement ID.

A measurement result according to the conditional handover measurement ID (measId) may not be included in at least one of the serving cell measurement result or the neighbor cell measurement result, according to an embodiment of the disclosure.

In this case, there may be no report quantity value while designing a new report configuration in the report configuration associated with the conditional handover measurement ID. When the report configuration associated with the conditional handover measurement ID is existing report configuration, a report quantity value in the report configuration may be ignored.

According to another embodiment of the disclosure, the measurement by the conditional handover measurement ID may be included in at least one of the serving cell measurement result or the neighbor cell measurement result, and measurement trigger quantity configured in the report configuration of the conditional handover measurement ID may be used as the report quantity for measuring a report result. When a plurality of measurement trigger quantities are connected to the conditional handover measurement ID, two highest cell ranks may be ordered for each quantity when selecting a best serving cell/neighbor cell rank.

Figure 7:
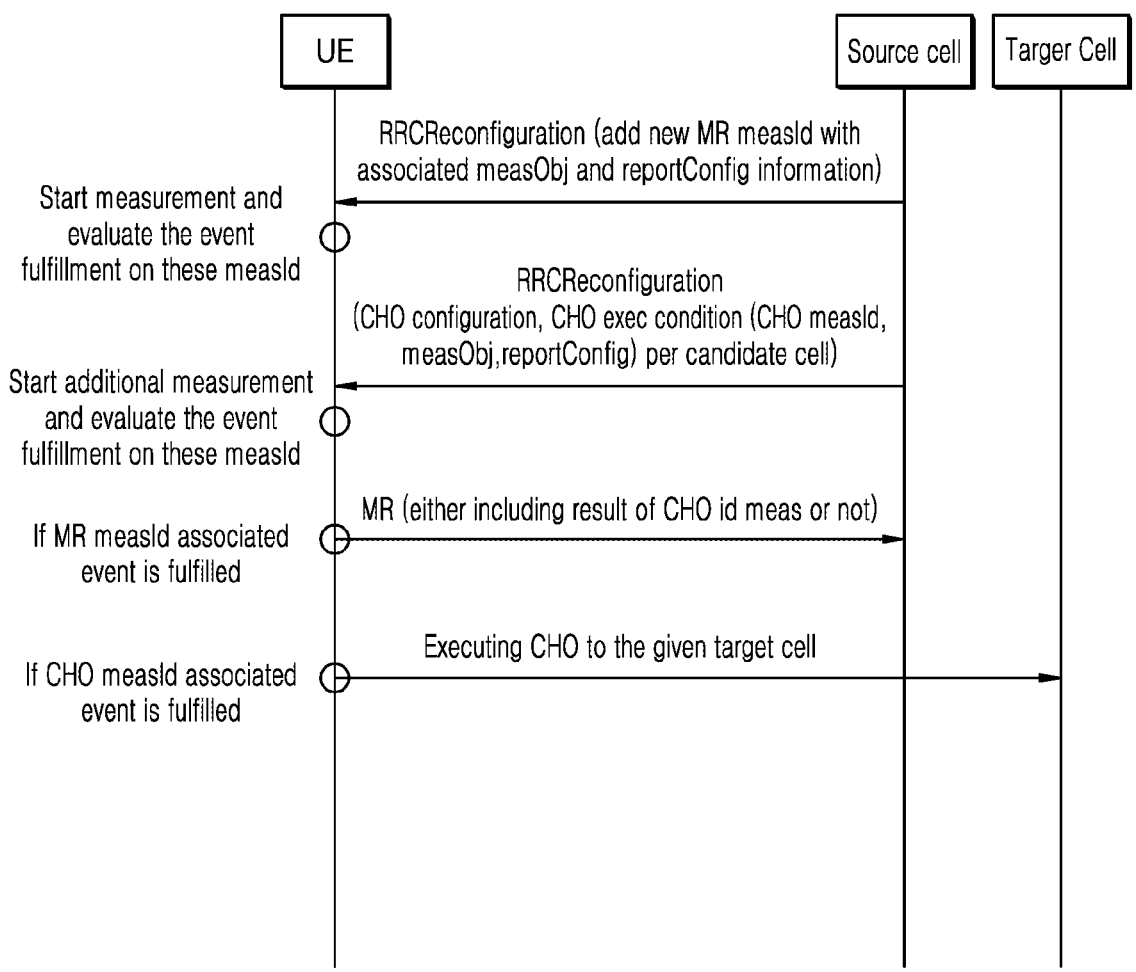
FIG. 7 is a flowchart of a case where a conditional handover measurement identification (ID) and a measurement report measurement ID are configured, according to an embodiment of the disclosure.

FIG. 7 is a flowchart of a case where a conditional handover measurement ID and a measurement report measurement ID are configured, according to an embodiment of the disclosure.

In FIG. 7, when a source cell configures a measurement report measurement ID to a UE via an RRCReconfiguration message, the UE may perform corresponding measurement from a time when the RRCReconfiguration message is received.

Also, the source cell may configure a conditional handover measurement ID to the UE via the RRCReconfiguration message at a certain point of time. Here, the conditional handover measurement ID may be configured in the RRCReconfiguration message for each candidate cell, and each measurement ID may be associated with a measurement object and report configuration. Upon receiving the RRCReconfiguration message, the UE may perform conditional handover measurement separately from measurement report measurement and evaluate whether a condition is fulfilled.

When event fulfillment by the measurement report measurement is fulfilled, the UE may transmit a measurement report to a serving cell. When an event by the conditional handover measurement is fulfilled, the UE may perform the conditional handover on a target cell without measurement report.

Figure 8:
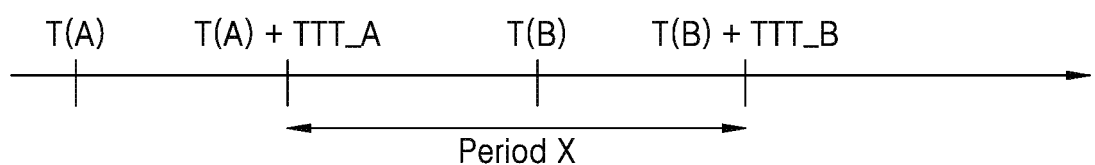
FIG. 8 illustrates an operation when two events of report configuration associated with a conditional handover measurement ID are configured to respective times-to-trigger, according to an embodiment of the disclosure.

FIG. 8 illustrates an operation when two events of report configuration associated with a conditional handover measurement ID are configured to respective times-to-trigger, according to an embodiment of the disclosure.

In FIG. 8, when an event A and an event B are configured in one report configuration associated with a conditional handover measurement ID or when two report configurations respectively include the event A and the event B and are associated with one conditional handover measurement ID, a UE may perform measurement and evaluate whether entering conditions of the event A and event B are fulfilled upon receiving a measurement ID including the report configuration. Also, a serving cell may configure a period X. In this case, when a time difference between a time point when TTT_A or TTT_B is passed after one of the event A and event B has entered an entering condition and a time point when the TTT_A or TTT_B is passed after the other one of the event A and event B has entered an entering condition is smaller than the period X, the UE may determine that the entering condition is fulfilled and perform conditional handover on a target cell associated with the entering condition.

Figure 9:
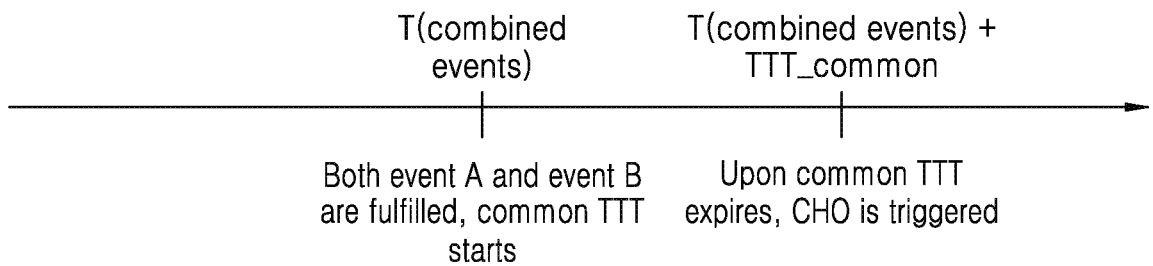
FIG. 9 illustrates an operation when report configuration associated with a conditional handover measurement ID is defined as one event and has one time-to-trigger, according to an embodiment of the disclosure.

FIG. 9 illustrates an operation when report configuration associated with a conditional handover measurement ID is defined as one event and has one time-to-trigger (TTT), according to an embodiment of the disclosure.

FIG. 9 illustrates an operation when a UE is configured with an entering condition where an event A and an event B are both fulfilled via report configuration associated with a conditional handover measurement ID and is also configured with a common TTT. Upon receiving the report configuration, the UE may consider that the entering condition is fulfilled when the entering condition is within the common TTT and perform conditional handover.

Figure 10:
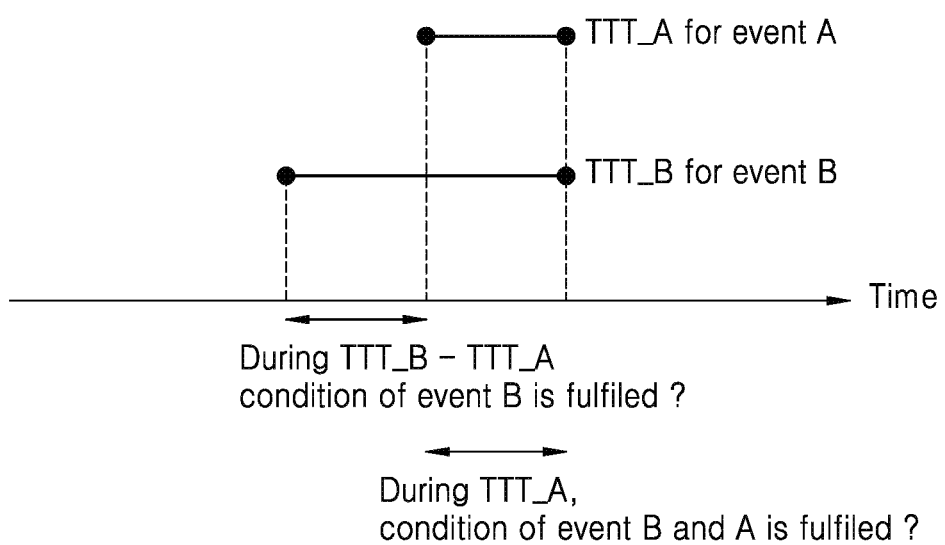
FIG. 10 illustrates an operation when report configuration associated with a conditional handover measurement ID is defined as a plurality of events and each event has respective times-to-trigger, according to an embodiment of the disclosure.

FIG. 10 illustrates an operation when report configuration associated with a conditional handover measurement ID is defined as a plurality of events and each event has respective TTT, according to an embodiment of the disclosure.

According to another embodiment of the disclosure, when events are configured with different TTT values instead of a common TTT, a UE may determine a following operation as fulfillment of a condition of conditional handover. First, the UE maintains each measurement value to a value after layer 3 filtering. The UE performs an algorithm of FIG. 11 during a window of TTT having a long value, with respect to every measurement value sample, based on the value after layer 3 filtering.

Figure 11:
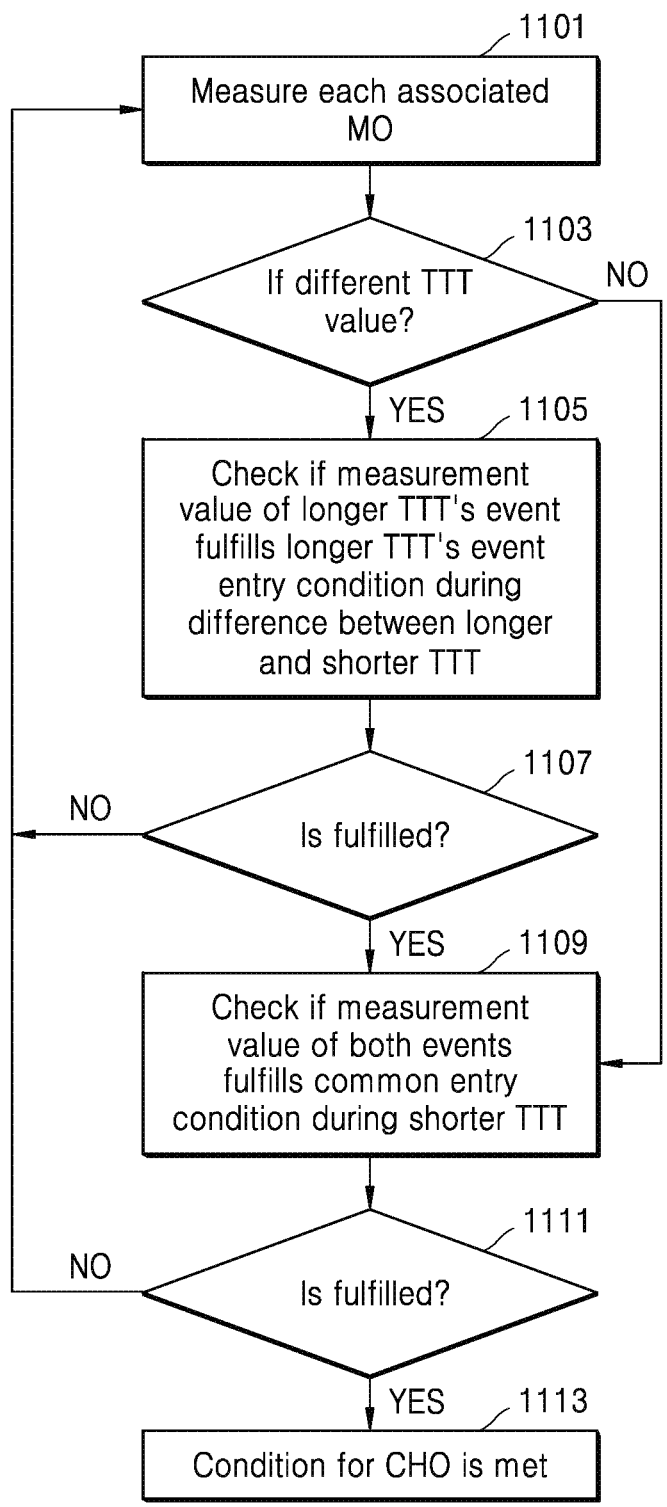
FIG. 11 is a flowchart of a conditional handover measurement algorithm, according to an embodiment of the disclosure.

FIG. 10 is a diagram for describing the algorithm of FIG. 11, wherein the UE first identifies whether an entering condition (TTT of an event B in FIG. 10) of an event associated with TTT having a relatively long value from among an event A and the event B is fulfilled for a 'time difference between TTT of a long value and a TTT of a short value' with respect to values obtained by measuring a corresponding measurement object. When the entering condition is fulfilled, the UE may identify, immediately or from when the entering condition is fulfilled, whether a condition (a common entering condition) fulfilling both entering conditions of the event A and event B is fulfilled for the TTT of the short value, with respect to the measurement values of the measurement object associated with the event A and event B. When an entering condition of an event of the TTT of the long value and the consecutive common entering condition are both fulfilled, the UE may consider that a condition of conditional handover is fulfilled and perform the conditional handover by selecting a cell associated with the condition of conditional handover as a target can candidate or a target cell.

When TTT (may be referred to as common TTT) is configured for two same events, the UE may determine only whether a common entering condition is fulfilled and when the common entering condition is fulfilled for the common TTT of a same value, the UE considers that a condition of conditional handover is fulfilled.

Events may be configured in different RS types and as different event types, there may be A3, A4, and A5. For example, types of events may include at least one of event A3 (neighbor becomes offset better than spcell), event A4 (neighbor becomes better than threshold), or event A5 (spcell becomes worse than threshold 1 and neighbor becomes better than threshold 2). The types of events are not limited to the above examples.

Also, each event may be an event based on a separate parameter having, as another quantity, RSRP/RSRQ/RSSI/SINR. According to an embodiment of the disclosure, the parameter may include an absolute threshold of an offset value, hysteresis value, cell offset, frequency offset value, or specific cell required when comparing two cells. However, the parameter is not limited thereto.

Also, according to an embodiment of the disclosure, the common entering condition is obtained by performing a logical AND operation on entering condition equations provided for events, and has a same concept as combined events of FIG. 9. For example, the common entering condition may be a condition in which two entering conditions are combined.

FIG. 11 is a flowchart of a conditional handover measurement algorithm, according to an embodiment of the disclosure.

In operation 1101, a UE may measure each associated measurement object (MO). According to an embodiment of the disclosure, the MO may include at least one cell.

In operation 1103, the UE may determine whether events of report configuration associated with each MO ID are configured in different TTT values. When the events are configured in different TTT values, the UE may perform operation 1105. When the events are not configured in different TTT values, the UE may perform operation 1107.

In operation 1105, the UE may determine (or check) whether a measurement value of an event of a longer TTT fulfills an entering condition (entry condition) of the event of the longer TTT during a difference between the longer TTT and a shorter TTT.

In operation 1107, the UE may determine whether the entering condition is fulfilled. In other words, the UE may perform operation 1101 or operation 1109 depending on a result of the determining in operation 1107. When the entering condition is not fulfilled, the UE may perform measurement on the MO as in operation 1101. When the entering condition is fulfilled, the UE may perform operation 1109.

In operation 1109, the UE may determine (or check) whether measurement values of two events fulfill a common entering condition during the shorter TTT.

In operation 1111, the UE may determine whether the common entering condition is fulfilled. In other words, the UE may perform operation 1101 or operation 1113 depending on a result of the determining in operation 1111. When the common entering condition is not fulfilled, the UE may perform measurement on the MO as in operation 1101.

In operation 1113, the UE may determine that a condition for conditional handover is met.

The methods according to the embodiments of the disclosure described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Embodiments of the disclosure may provide an apparatus and method for effectively providing a service in a wireless communication system.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, a portion of one embodiment of the disclosure and a portion of another embodiment of the disclosure may be combined with each other to enable a base station and a UE to operate. Further, the embodiments of the disclosure are also applicable to another communication system, and other modifications based on technical ideas of the embodiments of the disclosure are also feasible.

What is claimed is:

1. A method, performed by a user equipment (UE), of performing conditional handover, the method comprising:
    receiving a radio resource control (RRC) reconfiguration message including:
        measurement configuration information including a plurality of measurement identifications (IDs),
        conditional handover configuration information including one or more measurement IDs for the conditional handover, and
        report configuration information including information indicating whether the report configuration information is associated with one of conditional handover or measurement reporting;
    performing measurement corresponding to at least one of the plurality of measurement IDs and the one or more measurement IDs for the conditional handover, based on the measurement configuration information;
    in case that the information indicates that the report configuration information is associated with the conditional handover, performing the conditional handover when an event corresponding to the one or more measurement IDs for the conditional handover is fulfilled based on a measurement result and the conditional handover configuration information; and
    in case that the information indicates that the report configuration information is associated with the measurement reporting, reporting a measurement result, based on the measurement result and the report configuration information associated with a measurement ID corresponding to the measurement result.

2. The method of claim 1, wherein the performing of the conditional handover comprises performing the conditional handover on a target cell without reporting, to a serving cell, the measurement result corresponding to the measurement ID for the conditional handover.

3. The method of claim 2, wherein the performing of the conditional handover comprises determining that a conditional handover event is fulfilled and performing the conditional handover when the measurement result does not satisfy a leaving condition for a certain period of time after satisfying an entering condition, based on the report configuration information associated with the measurement ID for the conditional handover.

4. The method of claim 3, wherein the performing of the conditional handover comprises, when there are a plurality of conditional handover events, performing the conditional handover when all of the plurality of conditional handover events are fulfilled.

5. The method of claim 1, wherein the report configuration information associated with the measurement ID for the conditional handover does not include condition information for a measurement result report.

6. The method of claim 1, further comprising, when the conditional handover is performed, suspending measurement and evaluation corresponding to the one or more measurement IDs for the conditional handover.

7. The method of claim 1, further comprising, when the conditional handover is performed, deleting the measurement ID for the conditional handover.

8. A user equipment (UE) for performing conditional handover, the UE comprising:
    a transceiver; and
    a processor combined to the transceiver and configured to:
    receive a radio resource control (RRC) reconfiguration message including:
        measurement configuration information including a plurality of measurement identifications (IDs),
        conditional handover configuration information including one or more measurement IDs for the conditional handover, and
        report configuration information including information indicating whether the report configuration information is associated with one of conditional handover or measurement reporting,
    perform measurement corresponding to at least one of the plurality of measurement IDs and the one or more measurement IDs for the conditional handover, based on the measurement configuration information,
    in case that the information indicates that the report configuration information is associated with the conditional handover, perform the conditional handover when an event corresponding to the one or more measurement IDs for the conditional handover is fulfilled based on a measurement result and the conditional handover configuration information, and
    in case that the information indicates that the report configuration information is associated with the measurement reporting, report a measurement result, based on the measurement result and the report configuration information associated with a measurement ID corresponding to the measurement result.

9. The UE of claim 8, wherein the processor is further configured to perform the conditional handover on a target cell without reporting, to a serving cell, the measurement result corresponding to the measurement ID for the conditional handover.

10. The UE of claim 9, wherein the processor is further configured to determine that a conditional handover event is fulfilled and perform the conditional handover when the measurement result does not satisfy a leaving condition for a certain period of time after satisfying an entering condition, based on the report configuration information associated with the measurement ID for the conditional handover.

11. The UE of claim 10, wherein the processor is further configured to, when there are a plurality of conditional handover events, perform the conditional handover when all of the plurality of conditional handover events are fulfilled.

12. The UE of claim 8, wherein the report configuration information associated with the measurement ID for the conditional handover does not include condition information for a measurement result report.

13. The UE of claim 8, wherein the processor is further configured to, when the conditional handover is performed, suspend measurement and evaluation corresponding to the one or more measurement IDs for the conditional handover.

14. The UE of claim 8, wherein the processor is further configured to, when the conditional handover is performed, delete the measurement ID for the conditional handover.

* * * * *